United States Patent [19]

Lee et al.

[11] Patent Number: 5,990,616
[45] Date of Patent: Nov. 23, 1999

[54] PLASMA DISPLAY PANEL FOR MULTI-SCREEN SYSTEM

[75] Inventors: Chun Woo Lee, Kyungoangbuk-Do; Hyuk Chae Kwon, Daegu, both of Rep. of Korea; Vlsdislav Georguevich Samorodov, Ryazan, Russian Federation; Anatoli Borisovich Pokryvailo, Ryazan, Russian Federation; Zhuravlev Stanislab Nikolaebich, Ryazan, Russian Federation; Sokolov Vladimir Mihailovich, Ryazan, Russian Federation; Starynina Tachyana Grugorebna, Ryazan, Russian Federation

[73] Assignees: Orion Ekerctric Co., Ltd., Gumi-shi, Rep. of Korea; SPC Plasma Co., Ryazan, Russian Federation

[21] Appl. No.: 08/666,323
[22] PCT Filed: Nov. 4, 1994
[86] PCT No.: PCT/KR94/00155
§ 371 Date: Sep. 4, 1996
§ 102(e) Date: Sep. 4, 1996
[87] PCT Pub. No.: WO96/14631
PCT Pub. Date: May 17, 1996

[51] Int. Cl.⁶ .............. H01J 17/49; H01J 1/62; H01J 63/04
[52] U.S. Cl. .......... 313/582; 313/584; 313/586; 313/484
[58] Field of Search ......... 313/483–84, 582–86, 313/590; 315/169.4; 445/24–25

[56] References Cited

U.S. PATENT DOCUMENTS 5,734,228  3/1998  Kwon et al. .............. 313/582

*Primary Examiner*—Sandra O'Shea
*Assistant Examiner*—Mack Haynes
*Attorney, Agent, or Firm*—Jacobson, Price, Holman & Stern, PLLC

[57] ABSTRACT

This invention discloses a plasma display panel for multi-screen system. The plasma display panel (10) comprises the upper dielectric plate (1) and the lower dielectric plate (2). Cathode electrode (3) and anode electrode (4) are orthogonally located between said plates (1) and (2). These electrodes (3) and (4) form display cell (5) and (6), the cell (5) being formed between barrier ribs (8) and the cell (6) being adjacent to one side of sealing seam (7). The display cells (5) and (6) are separated by barrier ribs (8). The display cell (6) adjacent to the sealing seam are made of a size increasing in direction perpendicular to the sealing seam (7) with respect to the rest of the display cell (5).

2 Claims, 1 Drawing Sheet

PLASMA DISPLAY PANEL FOR MULTI-SCREEN SYSTEM

TECHNICAL FIELD

The present invention relates to a structure of a plasma display panel and more particularly, to a structure of a plasma display panel for multi-screen system in which the display cells adjacent to the sealing seas of the panel are made of a size increasing in the direction perpendicular to the sealing seam with respect to the rest of the display cells thereby reducing a distortion of information displayed on the screen.

BACKGROUND ART

The most similar prior art in technical essence to this invention is the plasma display panel disclosed in USSR Patent No. 1074301 (Mar. 30, 1982). This plasma display panel comprises upper and lower plates and systems of mutually orthogonal electrodes, in which display cells adjacent to the sealing seam are formed by hollows of grooves, and an external sealing element is separated from internal cell volume by a light-translucent element with a round cross-section inserted into the hollow and located around the edges.

However, the disadvantages of the USSR patent is in a loss of a pitch at the place of joint of panels because of large thickness of the sealing seam and which results in a distortion of the information displayed on the screen.

DISCLOSURE OF THE INVENTION

Accordingly, in consideration of the disadvantages of the described patent, the main object of the present invention is to provide a plasma display panel having an improved information quality by eliminating an information distortion at the place of the panel sealing parts.

To accomplish the object, the present invention comprises upper and lower dielectric plates, cathode and anode electrodes orthogonally located between said plates, display cells defined by said electrodes, barrier ribs for seperating and defining display cells from each other and sealing seam for sealing edge parts of said two plates, in which the display cells adjacent to the sealing seam are made of a size increasing in direction perpendicular to the sealing seam with respect to the rest of the display cells.

DETAILED DESCRIPTION OF THE INVENTION

Figure 1:
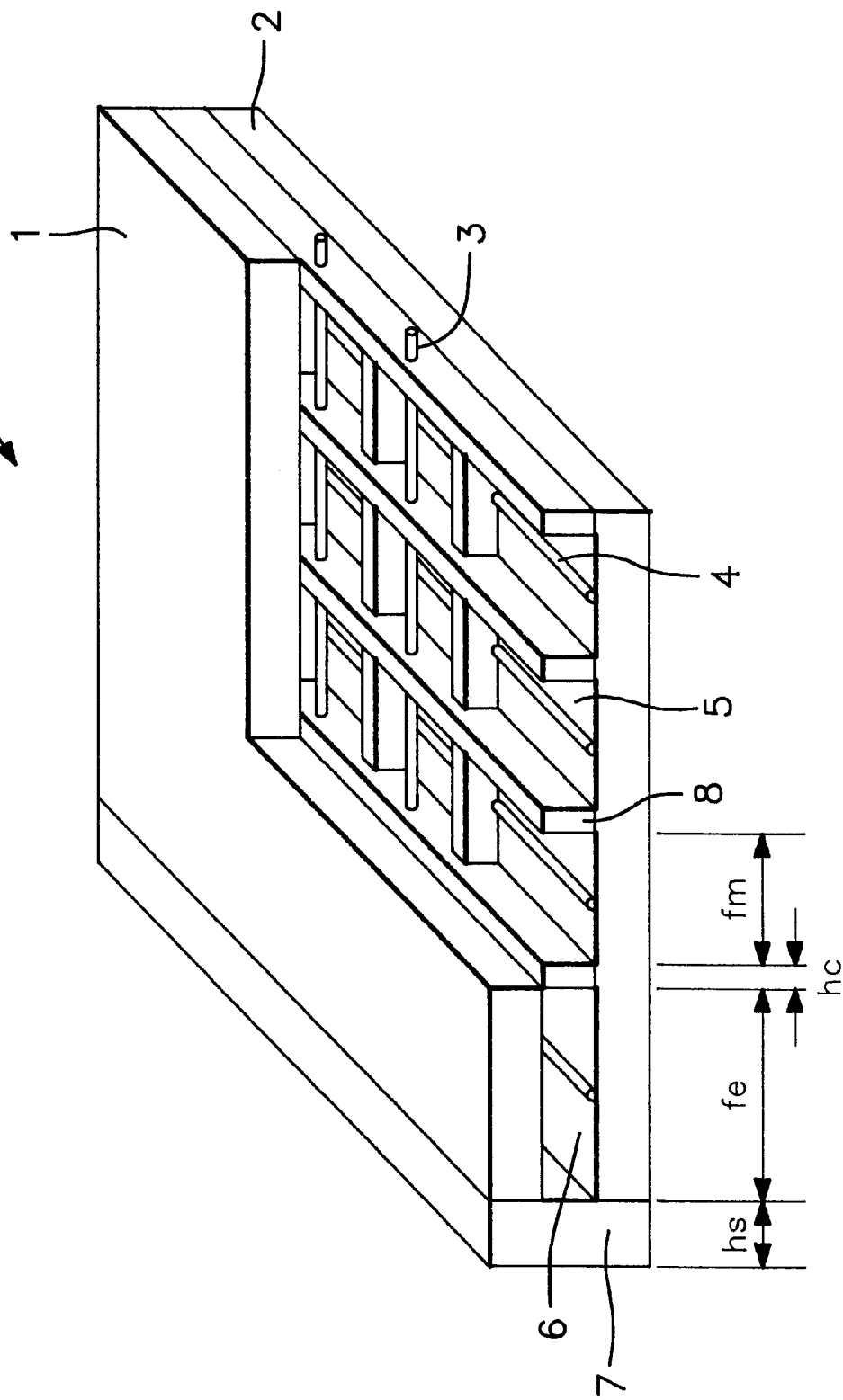
FIG. 1 is a schematic view depicting the plasma display panel for PDP multi-screen system.

In FIG. 1, PDP (10) comprises the upper dielectric plate (1) and the lower dielectric plate (2). Cathode electrode(3) and anode electrode(4) are orthogonally located between said plates (1) and (2). These electrodes (3) and (4) form display cell (5) and (6), the cell (5) being formed between barrier ribs (8) and thew cell (6) being adjacent to one side of sealing seam (7). The display cells (5) and (6) are separated by barrier ribs (8).

As depicted, the horizontal length of display cell (6) adjacent to sealing seam (7) is more long than the horizontal length of display cell (5) being formed between barrier ribs (8) and that the following ratio should be observed:

$$0.5(hs-hc)+lm \leq le \leq (hs-hc)+lm$$

le: size of cell (6) adjacent to the sealing seam (7);

lm: size of cell (5)

hs: width of sealing seam (7);

hc: width of barrier rib (8) between cells (5);

For example, if size of cell(5) is 1.2×2 mm, width of sealing seam (7) is 1.5 mm and width of barrier ribs (8) between cells (5) is 1.5 mm, size of cell (6) adjacent to the sealing seam (7) becomes 2.7 mm.

Increasing of size of cell (6) adjacent to the sealing seam (7) within the limits of given ratio results in keeping of specific light flux constant in the centre of panels and the place of their joints and it assists to create more favourable conditions for an operator to read the screen information.

When making size of cells (6) adjacent to the sealing seam (7) $le \geq (hs-hc)+lm$, an intensified light occurs in the region of the sealing seam being provoked by light flux increase of more than 30% and resulting in information perception with distortion.

When making size of cells (6) adjacent to the sealing seam (7) $le \leq (hs-hc)+lm$, a loss of information takes place as a result of light flux reduction coming from cell adjacent to the sealing by more than 30%.

±30% is permissable limit of screen non-uniform light for DC-type plasma display panels required for normal perception of information on the screen.

As above mentioned, this invention allows to eliminate video-information distortion in multi-screen system in places of panel joints and it results in quality improvement of information displayed.

We claim:

1. A plasma display panel for multi-screen system comprising:

upper and lower dielectric plates;

cathode and anode electrodes orthogonally located between said plates;

display cells defined by said electrodes;

barrier ribs for separating and defining display cells from each other; and a sealing seam for sealing edge parts of said two plates, wherein the length in a direction perpendicular to the sealing seam of the display cells adjacent to the sealing seam is greater than that of the rest of the display cells.

2. A plasma display panel according to claim 1 wherein a size ratio between display cells adjacent to the sealing seam and the rest of the display cells is expressed by the following equation:

$$0.5(hs-hc)+lm \leq le \leq (hs-hc)+lm$$

le: size of cell adjacent to the sealing seam;

lm: size of cell;

hs: width of sealing seam;

hc: width of barrier rib between cells.

* * * * *